United States Patent [19]

Ragen

[11] 3,778,778

[45] Dec. 11, 1973

[54] CALCULATOR WITH SELF-SYNCHRONOUS RECIRCULATING MEMORY

[75] Inventor: Robert A. Ragen, Hayward, Calif.

[73] Assignee: The Singer Company, New York, N.Y.

[22] Filed: Dec. 22, 1970

[21] Appl. No.: 100,761

Related U.S. Application Data

[62] Division of Ser. No. 779,666, Nov. 29, 1968, which is a division of Ser. No. 319,704, Oct. 29, 1963, Pat. No. 3,546,676.

[52] U.S. Cl. .............................................. 340/172.5

[51] Int. Cl. .............................................. G06f 13/02

[58] Field of Search .................................. 340/172.5

[56] References Cited

UNITED STATES PATENTS 3,064,241 11/1962 Schneider .................... 340/172.5 X

*Primary Examiner*—Raulfe B. Zache
*Attorney*—Patrick J. Schlesinger, Charles R. Lepchinsky, Warren P. Kujawa and Jay M. Cantor

[57] ABSTRACT

A self-synchronous recirculating memory for use in an electronic calculator. A serial data train having a special synchronizing pulse at the leading end is continuously recirculated through a recirculating memory comprising a dynamic storage device and portions of the calculator arithmetic unit. Each reappearance of the leading sync pulse at the output of the storage device starts the operation of the calculator timing unit. The timing unit is provided with circuitry for automatically stopping the timing unit once a predetermined count is reached. Special circuitry places a sync pulse in the recirculating memory when no data is present therein.

7 Claims, 6 Drawing Figures

INVENTOR.
Robert A. Ragen
BY

CALCULATOR WITH SELF-SYNCHRONOUS RECIRCULATING MEMORY

STATEMENT OF RELATED CASES

This application is a division of U.S. Pat. application Ser. No. 779,666, filed Nov. 29, 1968, which is a division of U.S. Pat. application Ser. No. 319,704 filed Oct. 29, 1963, now U.S. Pat. No. 3,546,676 issued Dec. 8, 1970.

SUMMARY OF THE INVENTION

This invention comprises a self-synchronous recirculating memory for use in an electronic desk top calculator. The recirculating memory comprises a dynamic storage device, preferably an acoustic delay line, a write means for writing data into the storage device, a read means for reading data out of the storage device, and a plurality of intercoupled single character registers, which preferably comprise a portion of the calculator arithmetic unit, coupled between the read and write means. The above elements are interconnected to provide for serial transfer of data from the storage means via the read means to the first single character register, parallel transfer between the single character registers, and serial transfer via the write means to the store means, all in cyclical fashion. A timing unit provides data entry and recirculation timing signals for controlling machine operation.

The timing unit comprises a free running oscillator coupled through a gate to a clock flip-flop which drives a series of counters. A control circuit responsive to the generation of at least one of the timing signals closes this gate. This gate is reopened by the occurrence of the leading data pulse, or synchronizing pulse, at the output of the storage device. In this way, the timing unit and recirculating memory are automatically synchronized once for each complete pass of data through the recirculating memory. Further, variations in the recirculation period due, e.g., to thermal variations of the pulse propagation time in an acoustic delay line, and variations in the period of the timing unit due to oscillator drift, have no effect on the operation of the system. Special circuitry places a sync pulse into the recirculating memory when no data is present therein.

For a fuller understanding of the nature and advantages of the invention, reference should be had to the following description taken in conjunction with the accompanying drawings.

DESCRIPTION OF PREFERRED EMBODIMENT

Figure 1:
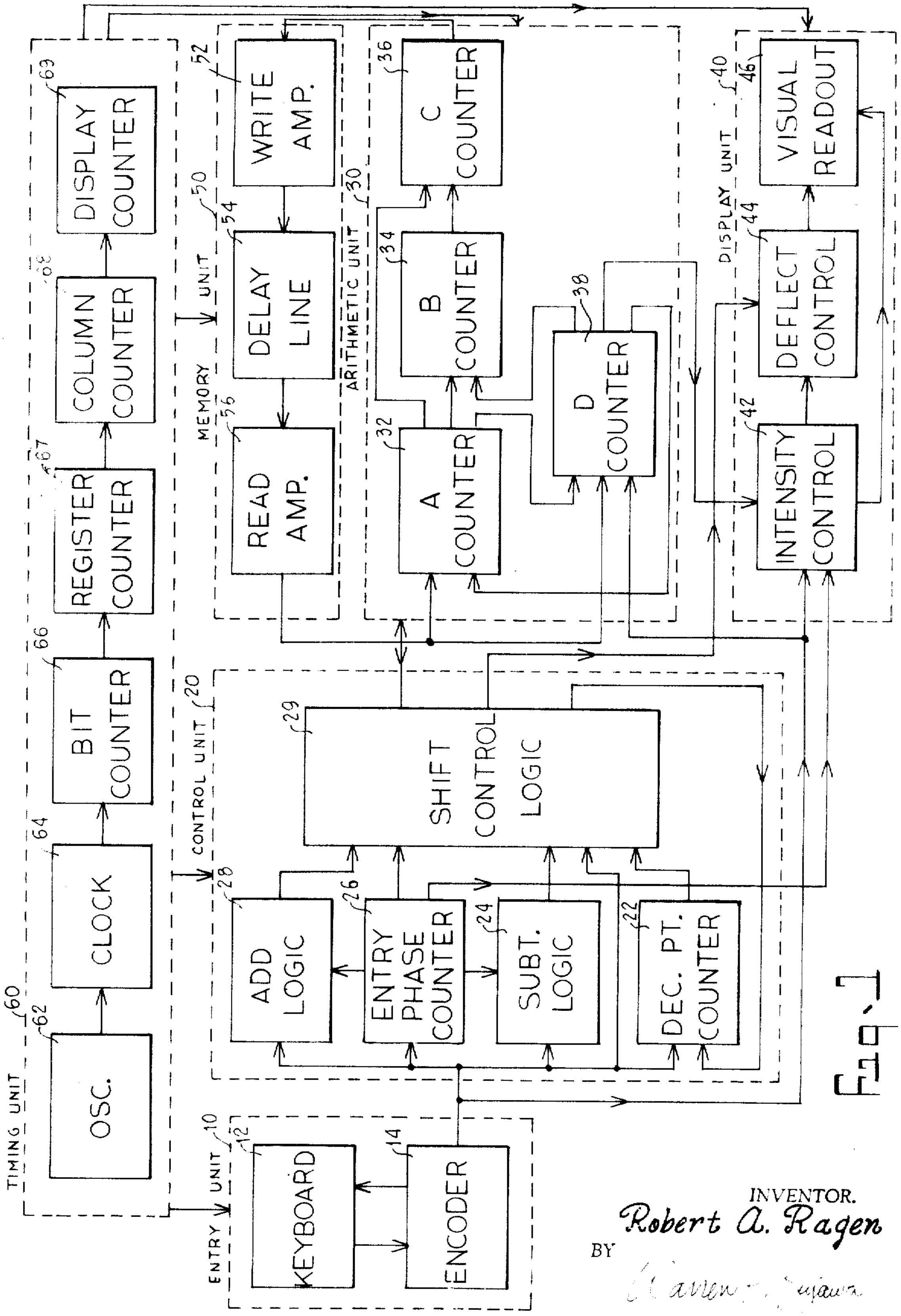
FIG. 1 is a block diagram of a calculator embodying the invention.

FIG. 1 is a block diagram of a calculator embodying the invention. In the ensuing description, reference is made to several sections and figures contained in U.S. Pat. application Ser. No. 319,704 filed Oct. 29, 1963 by R. A. Ragen, now U.S. Pat. No. 3,546,676 issued Dec. 8, 1970, and assigned to the assignee of the present invention, the disclosure of which is hereby incorporated by reference.

In FIG. 1, the six basic units are indicated by broken rectangles, while the major components included in each basic unit are indicated by solid rectangles. Interconnections between the various components and units are generally indicated in FIG. 1 by solid arrowed lines. The actual structure and specific interconnections of the components can be ascertained by reference to the sections and figures of the aforementioned Ragen patent indicated below. In the ensuing description of FIG. 1, those referenced figures which comprise portions of the logic diagram (Section 16.1) are enclosed in parentheses, while those figures which comprise portions of the more detailed circuit diagram (Section 14.4) are not.

As shown in FIG. 1, an entry unit 10 is coupled to a control unit 20, an arithmetic unit 30, and a display unit 40. Entry unit 10 comprises a keyboard 12 and an encoder 14. As shown in FIGS. 182–185 (FIGS. 297, 298), keyboard 12, which enables operator entry of numeric data and control of functions to be performed by the calculator, comprises a plurality of digit keys 0, 1, . . . 9, a plurality of function keys, e.g., ADD, SUBTRACT, CLEAR ALL, etc., and their associated switches. Encoder 14, which serves to translate the actuation of various keys into signals which enable selected components of control unit 20, arithmetic unit 30, and display unit 40, comprises the components specified in Section 16.1.5 and shown in detail in FIGS. 182–189, 196, 197, 225–234, and 246 (FIGS. 297, 298).

Control unit 20, which generally produces control signals which direct the flow of data through arithmetic unit 30 comprises a decimal point counter 22, a subtract logic circuit 24, an entry phase counter 26, an add logic circuit 28, and a shift control logic circuit 29. The inputs of the first four of these components are each coupled to encoder 14, while their outputs are each coupled to shift control logic 29. Shift control logic 29 is coupled to arithmetic unit 30, to display unit 40, and to the input side of decimal point counter 22. The output of entry phase counter 26 is additionally coupled to intensity control circuit 42 of display unit 40.

Decimal point counter 22, which provides control signals to shift control logic 29 during decimal align, multiply, and divide, comprises four flip-flops interconnected as shown in FIG. 240 (FIG. 302)) and having inputs as specified in these figures. The outputs of the decimal point counter flip-flops are connected to various portions of shift control logic 29, e.g., to the inputs of gate 40 as shown in FIG. 243 (FIG. 302).

Entry phase counter 26, which provides sequence control signals to add logic 28, subtract logic 24, shift control 29, and intensity control 42, comprises three flip-flops interconnected as shown in FIG. 238 (FIG. 301) and having inputs as specified in these figures. The toggle input, e.g., to EPC1 flip-flop of entry phase counter 26 is obtained from AND-gate 28, shown in FIG. 239 (FIG. 302) which produces a toggle signal when HOME signal is generated by a timing unit 60 described below. The outputs of the entry phase counter flip-flops are connected to portions of add logic 28 and subtract logic 24 as shown in FIG. 228, and to various portions of shift control logic 29, e.g., to gates 74 and 76 which are coupled to gates 80 and 82, respectively, as shown in FIGS. 254, 255, and 257 (FIGS. 304, 306).

Add logic 28 and subtract logic 24, which provide enabling signals to shift control logic 29 during ADD and SUBTRACT operations, comprise an add flip-flop and a subtract flip-flop whose inputs are connected as shown in FIG. 228 to the specified outputs of encoder 12 and entry phase counter 26, and gate 6, the inputs to which are the set outputs of the add and subtract flip-flops as shown in FIG. 233. The outputs of add logic 28 and subtract logic 24 are coupled to shift control logic 29, e.g., via gates 15, 26, and 48 to gate 78 as shown in FIGS. 236, 239, 247, and 256 (FIGS. 301, 303, 306).

Shift control logic 29, which provides several shift control signals which control the path of data through arithmetic unit 30 during the various states of the calculator as described below, comprises numerous logic elements which are interconnected as shown in FIGS. 255–294 of the above-mentioned circuit diagram (FIGS. 297–313 of the logic diagram). For example, gates 84, 86, 85, and 81 of shift control logic 29 are coupled to A counter 32, B counter 34, C counter 36, and D counter 38, respectively, as shown in FIGS. 257, 258, and 263–275 (FIGS. 305–309). Also, gate 81 of shift control logic 29 is coupled to the horizontal staircase generator portion of deflection control circuit 44, as shown in FIGS. 211, 212, and 257 (FIGS. 306, 313).

Arithmetic unit 30, which is coupled to the other basic units as noted above, comprises four digisters 32, 34, 36, and 38. As employed herein, the term digister is understood to mean any device capable of accepting a transfer of and capable of storing a representation of a digit. Such devices include shift registers and binary counters adapted to receive serial or parallel digit transfers, whether magnetic core, conventional, cryotronic, thin film or semiconductor integrated construction is employed in fabricating them. In the preferred embodiment shown in FIG. 1, digisters 32, 34, 36 and 38 are counters. Each counter comprises five flip-flops interconnected in a special way and associated gates. Alternate interconnections are provided between the various counters so that a digit may be transferred between interconnected counters. The flip-flop interconnections for A counter 32, B counter 34, C counter 36, D counter 38, as well as the between counter interconnections, are shown in FIGS. 261–265, 266–268, 272–274, and 269–271, respectively. As discussed more fully below, the output of read amplifier 56 of memory unit 50 is coupled to the input of A counter 32 and D counter 38. Further, the output of C counter 36 is coupled to write amplifier 52 of memory unit 50 via gates 101 and 102 as shown in FIGS. 275 and 276 (FIGS. 308, 309).

Display unit 40 comprises intensity control circuit 42 which is coupled to deflection control circuit 44 and visual readout device 46. Intensity control circuit 42 and deflection control circuit 44 comprise the components shown in detail in FIGS. 194, 195, 207–224, and 277–283 (FIGS. 310, 313), while visual readout device 46 comprises a cathode ray tube, the schematic for which is shown in FIG. 283.

Memory unit 50 comprises a write amplifier 52, a delay line 54, and a read amplifier 56. Write amplifier 52, which is shown in detail in FIG. 201, is coupled to delay line 54 as shown in FIG. 276. Delay line 54 is coupled to read amplifier 56 in the manner illustrated in FIG. 276. Read amplifier 56, which is shown in detail in FIG. 198, is coupled to A counter 32 of arithmetic unit 30 via gate 90 as shown in FIGS. 260 and 261 (FIG. 306). Read amplifier 56 is also coupled to D counter 38 of arithmetic unit 30 via gate 89 as shown in FIGS. 260 and 261 (FIG. 306).

Figure 5:
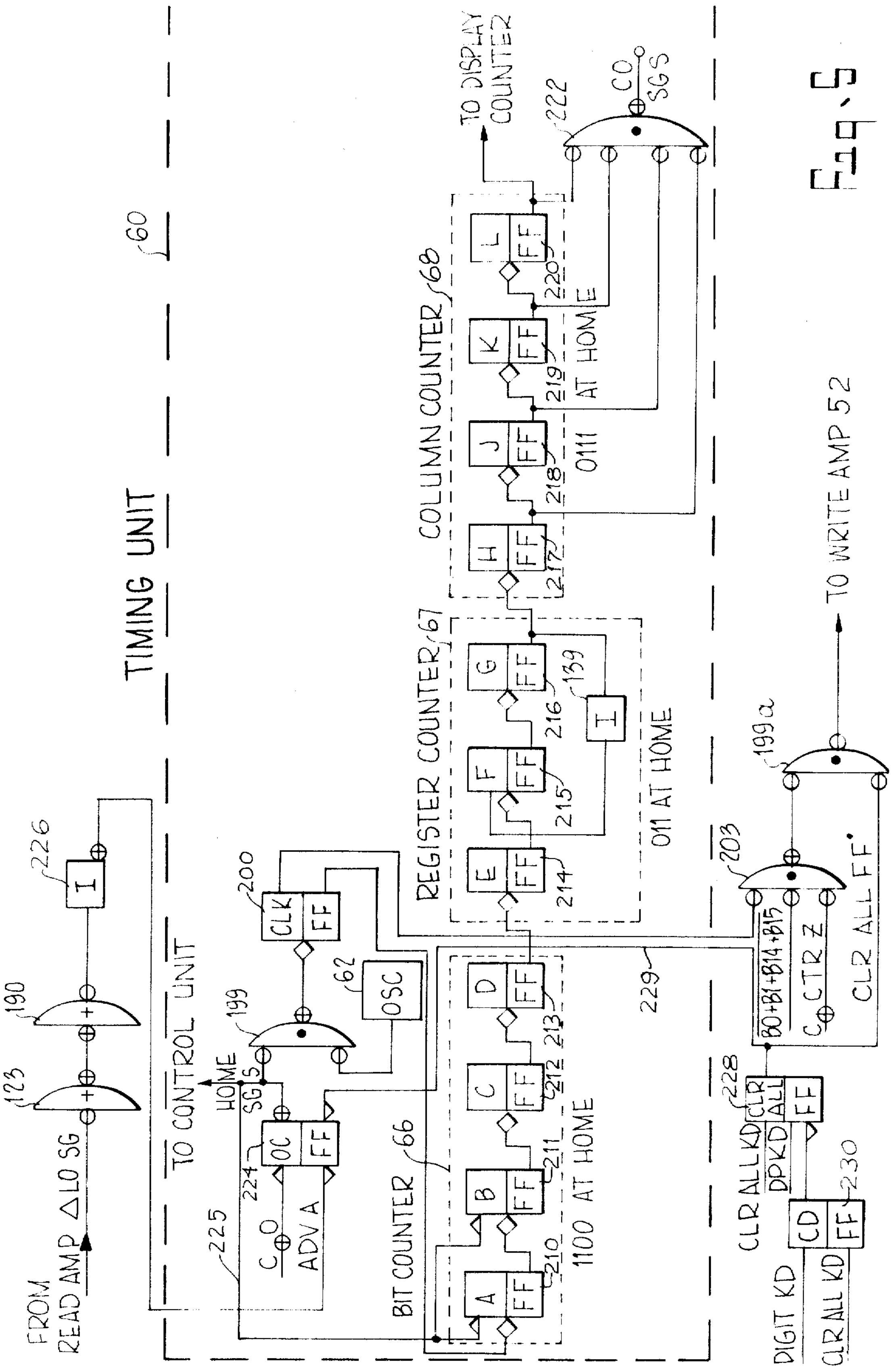
FIG. 5 is a block diagram illustrating the operation of a preferred embodiment of the invention.

Timing unit 60, which provides timing signals to the other five basic units, comprises six major components—an oscillator 62, a clock 64, a bit counter 66, a register counter 67, a column counter 68, and a display counter 69. Oscillator 62, shown in detail in FIG. 200, is coupled to clock 64 via gate 99 as shown in FIG. 284. Clock 64, in turn, is coupled to the first of a series of interconnected flip-flops, the first four of which comprise bit counter 66, as shown in FIG. 286. Bit counter 66 is coupled to register counter 67, which comprises the next three interconnected flip-flops as shown in FIGS. 286 and 288. Register counter 67 is coupled to column counter 68, which comprises the succeeding four interconnected flip-flops as shown in FIG. 290. Column counter 68 is coupled to display counter 69 via gates 120 and 122 as seen in FIG. 291 and gate 123 as shown by FIG. 293. The interconnections between the various components of timing unit 60 and the other basic units are schematically portrayed in the logic diagram (FIGS. 297–313) and specifically shown in the circuit diagram, FIGS. 225–294. Portions of timing unit 60 necessary for an understanding of the present invention are shown in FIG. 5.

Memory unit 50 together with portions of arithmetic unit 30 comprise a recirculating memory. Data representing numerical information is written onto delay line 54 in the form of acoustic pulses by write amplifier 52. After traversing the delay line, the data is converted to electrical pulses by read amplifier 56 and presented in this form to arithmetic unit 30. In IDLE mode, when no arithmetic or functional operations are being performed, the electrical data pulses are serially read into A counter 32, parallel transferred into B counter 34, then parallel transferred into C counter 36, and serially written back onto delay line 54 by write amp 52. This A counter 32-B counter 34-C counter 36 route through the arithmetic unit is termed the normal path. Data follows other paths through arithmetic unit 30 when arithmetic or other functional operations are being performed, as discussed below under the heading GENERAL OPERATION.

DATA ORGANIZATION

Figure 2:
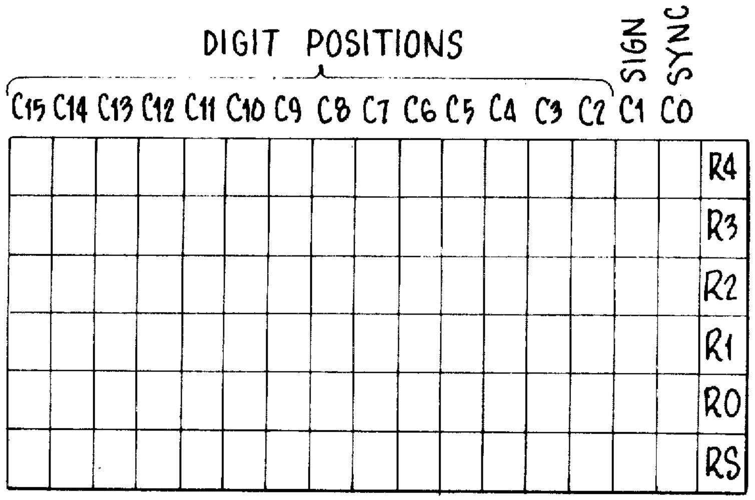
FIG. 2 illustrates the data organization utilized in the calculator of FIG. 1.
Figure 3:
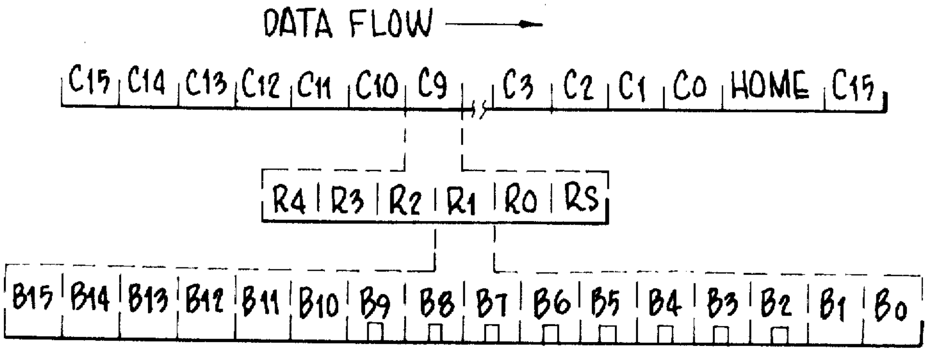
FIG. 3 shows the serial data train utilized in the calculator of FIG. 1.

The organization of data within the recirculating memory of the calculator depicted in FIG. 1 is illustrated in FIGS. 2 and 3. FIG. 2 shows an organization of a plurality of registers RS, RO, R1, R2, R3, and R4, each having a plurality of digit positions C0 through C15. As will be apparent to those skilled in the art, this organization may be achieved in various ways. In the preferred embodiment of this invention, the register organization of FIG. 2 is realized by a serial data train which is recirculated through the recirculating memory. Each register is considered to be composed of a plurality of recirculating space-time compartments called cells, each of which contains a digit word of zero to nine pulses. Each cell is associated to two groups: a column group and a register group. This serial data train is arranged, as shown in FIG. 3, with the digit positions of the registers interlaced so that the cells of a given column are all located adjacent each other, while the cells of a given register are spaced at regular intervals. The order of serial progression of the cells is from C0 to C15 and RS to R4. This arrangement is schematically portrayed in FIG. 3 wherein the direction of data flow is considered to be to the right as indicated by the arrow. Column group C9, for example, includes the like order digit positions of each register RS, RO, R1, R2, R3, and R4, with the lowermost register RS digit position occurring first and the uppermost register R4 digit position occurring last. Also, by way of example, register group R1 includes cells COR1, C1R1, C2R1, . . . , C15R1 all separated by six cells, with the lowermost column C0 digit position occurring first and the uppermost column C15 digit position occurring last. Each complete occurrence of the data train C0 through C15 is followed by a HOME period 19 during which time no signals or data occur and after which the entire data train is repeated.

In the above organization, the first column C0 contains a sync pulse or signal which indicates the end of the HOME period and the beginning of a new serial data train, C0-C15. The contents of column C1 digit position are the individual sign bits corresponding to each numeral, if any, in associated registers RS, R0, R1, R2, R3, and R4. In the preferred embodiment, a one bit in the C1 digit position specifies a negative number, while a zero bit in this position specifies a positive number. The digit positions of each of the remaining columns C2–C15 contain the digits of the number, if any, in each associated register.

In the preferred embodiment, each digit position utilizes a pulse count notation such as is illustrated in FIG. 3 for the ninth order C9 of the register R1. Each digit position contains sixteen B0–B15 time spaces, only nine of which, B2–B10, are used to provide pulse notations for each of the digits, zero through nine. For example, a one is denoted by a pulse in the time period B2, a two denoted by a pulse in each time period B2 and B3, a three is denoted by a pulse in each time period B2, B3, and B4, etc., with a zero being indicated by an absence of a pulse in the time periods B2-B10. Thus, FIG. 3 illustrates an eight in the C9 digit position of the register R1.

Figure 4A:
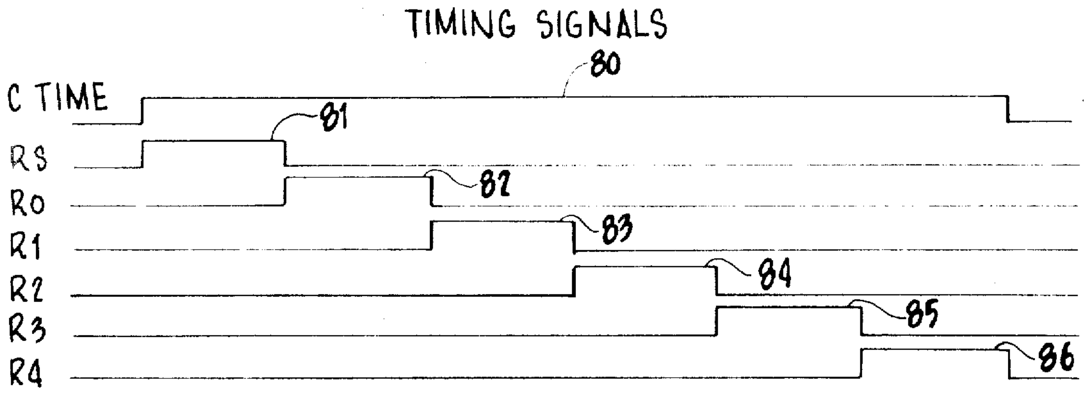
FIGS. 4A and 4B show appropriate timing signals used to control the operation of the calculator.
Figure 4B:
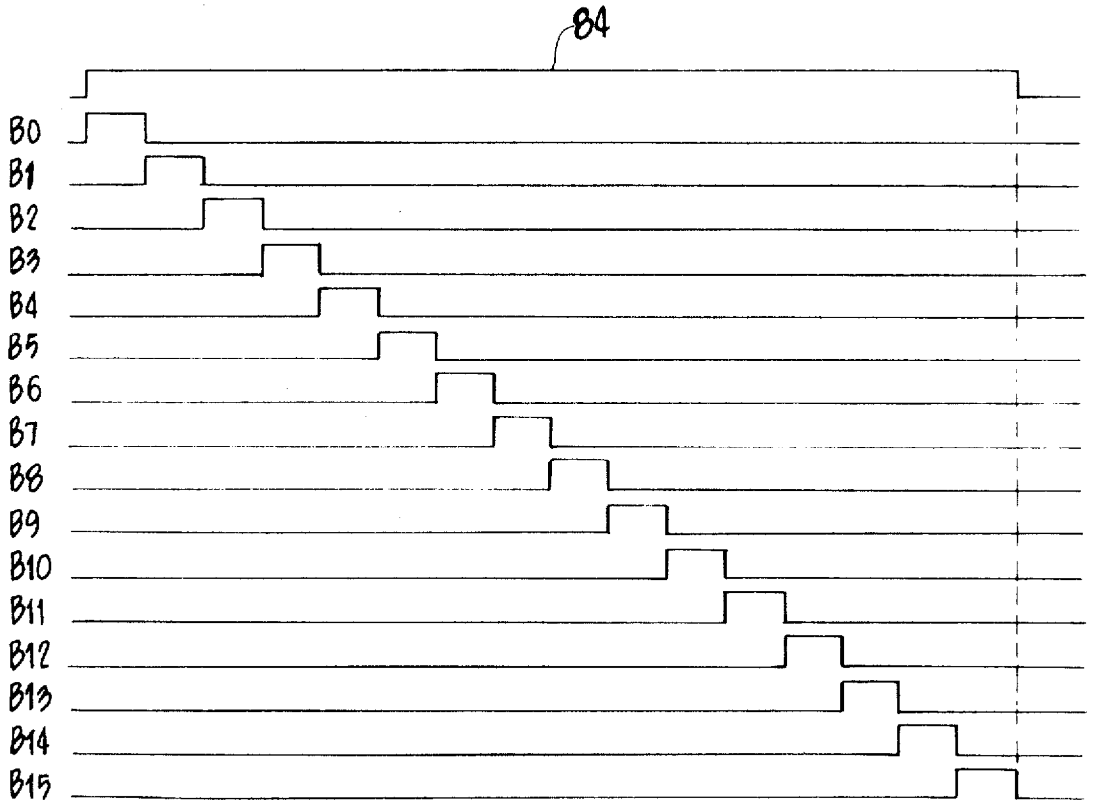

The register organization illustrated in FIG. 3 is accessed in an interlaced, serial manner as shown in FIG. 4 by means of recurring control and timing signals such as illustrated by FIGS. 4A and 4B. Referring now to FIG. 4A, there is illustrated a single column C signal 80. For purposes of simplicity and clarity, only one column signal is illustrated. As will be apparent to those skilled in the art, however, the column signals will occur sequentially, there being one such signal for each of the columns C0–C15. For each column signal, there are six independently occurring register signals 81–86, one for each of the six registers RS, R0, R1, R2, R3, and R4, respectively, with the register RS control signal 81 occurring first in time and the register R4 control signal 86 occurring last in time as shown in FIG. 4A. As will now be apparent, the simultaneous occurrence of a column C signal and one register signal determines the occurrence, or accessibility, of a particular digit position C0–C15 of a particular register with like order register digit positions occurring consecutively for each column.

As discussed above, each register digit position includes sixteen B0–B15 time spaces. Access to such time spaces is accomplished by 16 independent and consecutively occurring signals as illustrated in FIG. 4B for the register R2 control signal 84 of FIG. 4A. FIGS. 4A and 4B thus illustrate control signals that may correspond to each of the 16 time spaces B0–B15 of each register digit position and each digit position C0–C15 of each register. As will be evident to those skilled in the art, the total number of column, register and bit timing signals may be selected to provide more or less column cells C, register cells R, or bit cells B. In this way, the data organization may be altered to provide more or less recirculating registers, registers having additional columns, etc.

GENERAL OPERATION

The general operation of the preferred embodiment of FIG. 1 can be best understood by assuming a problem, for example addition of the digits "2" and "7". To begin, the operator actuates the digit "2" key on keyboard 12. This keyboard information is translated into machine instruction signals by encoder circuit 14 and presented to the input circuit of D counter 38 but does not enter the D counter at this time. Encoder circuit 14 also presents decimal alignment information to decimal point counter 22 and causes entry phase counter 26 to begin cycling through a predetermined program.

If the digit "2" is the first digit of a number to be entered (which is true in this case), entry phase counter 26 initiates a SHIFT UP, by actuating shift control logic circuit 29, whereby the contents of the recirculating registers R1, R2, R3, and R4 of the delay line memory are shifed up. This step requires a single phase of the field word through arithmetic unit 30 and, as discussed in detail, in Section 16.7.5, results in all zeros in register R1. The SHIFT UP is accomplished by transfer of the data from A counter 32 to D counter 38, and simultaneously from the D counter to B counter 34 during every R1, R2, R3, and R4 register time. It is noted that during SHIFT UP, there is no direct transfer from A counter 32 to B counter 34 during any of these register times. Also, during RS and R0 register times, data follows the normal path from A counter 32 to B counter 34 to C counter 36.

Entry phase counter 26 next initiates a SHIFT LEFT R1 by actuating shift control logic 29, whereby the contents of register R1 are shifted one column to the left. As discussed more fully in Section 16.4, this SHIFT LEFT R1 first causes the data (the digit "2"), that was initially presented to the input circuit of D counter 38 to be entered into the D counter, and then causes this data to be inserted into the memory loop at the C2R1 position, i.e., during Column 2, Register 1 time. SHIFT LEFT R1 is accomplished by initiating a transfer from A counter 32 to D counter 38 and simultaneously from the D counter to B counter 34 during each R1 register time. At such time, there is no direct transfer from A counter 32 to B counter 34. During the remaining register times (RS. R0, R2, R3, and R4) data follows the normal path. As with the SHIFT UP step, SHIFT LEFT R1 takes place during one pass or cycle through arithmetic unit 30.

After the SHIFT LEFT R1 step, the calculator returns to the IDLE condition. Digit "2" now appears in the C2R1 position of the recirculating information.

During the SHIFT UP and SHIFT LEFT procedures and during any rearrangement or modification of the data contained in the respective register positions, visual readout device 46 is blanked. Blanking is achieved by applying a blanking signal from entry phase counter 26 to display intensity control circuit 42. It should be noted that, as discussed more fully in Sections 16.3 and 16.11, the register contents are displayed by visual readout device 46 during the cleared and the IDLE conditions only. At other times, entry phase counter 26 serves to blank readout device 46.

The operation of the calculator during DISPLAY mode is as follows. When data which is to be displayed appears in A counter 32, the data is shifted by parallel transfer or broadsiding into D counter 38. While in the D counter, this data controls display intensity control circuit 42, so that the proper segments that are necessary to trace out the digit on the screen of the cathode ray tube display are selected and intensified for visual readout.

Display deflection control circuit 44 deflects the electron beam of the cathode ray tube display so that the beam traverses the configuration of a figure eight and a decimal point for each column position of each register to be displayed. However, only those segments that correspond to the digit in the D counter will be intensified, while the other segments or strokes of the electron beam will be blanked. Display intensity control circuit 42 acts to energize the cathode ray tube, whereas display deflection control circuit 44 serves to deflect the electron beam generated by the cathode ray tube. For a more detailed discussion of machine operation during the DISPLAY mode, see Section 16.11.

After entry of the digit "2", the ENTER key of the keyboard is depressed. Actuation of this key establishes that the last digit of a number has been entered into the memory unit. In this example, "2" is the first and last digit of the number. Entry phase counter 26 then causes shift control logic 29 to deciaml align the number now entered in register R1.

The operator next inserts the next digit word, which in this example is the digit "7", and the calculator follows the same format as set forth above. In this case, during the SHIFT UP step, the digit word "2" is shifted up from register R1 to the next register R2, and then the digit word "7" is entered into register R1.

The operator then actuates the ADD function key in order to effectuate a summation of the digits "2" and "7". When the ADD key is actuated, encoder circuit 14 translates this action into machine commands. One ouptut signal from encoder circuit 14 triggers entry phase counter 26 to cycle through a predetermined program, which is built into the machine.

The first step of the ADD program is decimal alignment, if necessary. This alignment is controlled by shift control logic 29 and decimal point counter 22. Shift control logic 29 shifts information in the R1 register to the left, until decimal point counter 22 determines that the number in register R1 is decimally aligned. For a more detailed discussion of machine operation during decimal alignment, see Section 16.6.

Entry phase counter 26 next causes the information in Registers R1, R2, R3, and R4 to be shifted down by one register. The SHIFT DOWN action is controlled by shift control logic 29, which causes a direct transfer from A counter 32 to C counter 36 during R1, R2, R3, and R4 register times. As a result, the two digit words or numbers "2" and "7" which are to be added are placed in the R1 and R0 (M/D) registers, respectively. For a more detailed discussion of machine operation during this SHIFT DOWN action, see Section 16.7.3. Entry phase counter 26 then activates add logic circuit 28 so that addition can be performed by arithmetic unit 30.

Addition is performed by adding like-order digits of the data contained in registers R0 and R1 after the above-described SHIFT DOWN action. For each order, this is accomplished by transferring the R0 digit into A counter 32, inhibiting reset of the A counter, and then transferring the R1 digit into A counter 32 on top of the R0 digit. To illustrate, using the above example the R0 digit "7" is first sequenced into A counter 32 from read amplifier 56. Next, the normal between-transfer resetting of the A counter to zero is inhibited by shift control logic 29 in response to an enabling signal from add logic 28. Then, the R1 digit "2" is sequenced into A counter 32. Since A counter 32 still contains the count of seven at the beginning of this latter step, the result of this latter sequencing is a count of nine ($7 + 2 = 9$) in the A counter. This resulting digit, the sum of the two digits, is then transferred in the normal way to B counter 34, then to C counter 36, etc. The above sequence A—inhibit reset A—sequence A action is followed for all orders C2-C14 to the RO and R1 register digits, and is accomplished in one pass of the field word through the arithmetic unit 30. Upon conclusion of the ADD operation, the calculator returns automatically to IDLE condition and DISPLAY mode. For a more detailed discussion of machine operation during ADD, see Section 16.7.9.

To simplify illustration of the SUBTRACT operation, assume that digit words representing a minuend and a subtrahend have already been entered in registers R2 and R1, respectively, and decimal aligned, in the manner described above. The operator then actuates the SUBTRACT function key, which action is translated by encoder circuit 14 into machine commands. One output signal from encoder circuit 14 triggers entry phase counter 26, which causes the decimally aligned contents of registers R1, R2, R3, and R4 to be shifted down by one register in the same manner as has been described above in the discussion of the ADD operation so that the minuend and subtrahend are shifted into the R1 and R0 (M/D) registers, respectively. Next, entry phase counter 26 actuates subtract logic circuit 24 so that subtraction can be performed by arithmetic unit 30.

Subtraction is performed by complementary addition of like-order R0 and R1 digits, that is, each R1 digit is added to the complement of each like-order R0 digit. This is accomplished as follows. In response to an enabling signal from subtract logic 24, shift control logic 29 causes the R0 digit from read amp 56 to sequence D counter 38. Since, as described in Section 16.2.6, D counter 38 is a recedable digister, this sequencing of the D counter results in the complement of the R0 digit being developed in D counter 38. The complemented R0 digit is then parallel transferred or broadsided into A counter 32. The R1 digit is next sequenced into the A counter on top of the complemented R0 digit. The resulting digit, representing the remainder or difference between the original, like-order R1 and R0 digits, is then transferred in the normal way to B counter 34, then to C counter 36, etc. This action is followed for all orders C2–C14 of the R0 and R1 register digits and is accomplished in one pass of the field word through arithmetic unit 30.

At the end of this pass, if originally the subtrahend was larger than the minuend, the contents of the R1 register will represent the complement of the desired answer. In such a case, shift control logic 29, in response to an enabling signal from subtract logic 24, causes R1 data to be complemented and the arithmetic sign to be changed during a second pass of the field word through arithmetic unit 30. The arithmetic sign of the R1 data is changed by adding one to the C1R1 digit position (the sign digit position). The R1 data is complemented by sequencing D counter 38 directly from read amplifier 56 for each R1 digit. As noted above, sequencing the D counter causes the complement of the sequencing digit to be developed in D counter 38. This complemented digit is then parallel transferred to B counter 34, while the normal A counter to B counter transfer is simultaneously inhibited by shift logic 29. From B counter 34, the complemented R1 digit is transferred to C counter 36 in the normal way. After the R1 data has been complemented, the calculator returns automatically to IDLE condition and DISPLAY mode. For a more detailed discussion of machine operation during SUBTRACT, see Sections 16.7.10 and 16.7.11.

To simplify illustration of the MULTIPLY operation, assume that digit words representing a multiplier and a multiplicand have already been entered in registers R2 and R1, respectively, and decimal aligned. The operator then actuates the MULTIPLY function key, which action is translated by encoder 14 into machine commands. One output signal from encoder circuit 14 triggers entry phase counter 26, which directs shift control logic 29 to shift the decimally aligned contents of register R1 down into the R0 register, and clear the R1 register. This is achieved by transferring data from A counter 32 to C counter 36 during each R1 register time and is discussed in detail in Section 16.7.12.

Multiplication is performed by repeated addition of the multiplicand in register R0 to the contents of register R1 a number of times which is controlled by the multiplier in register R2. This is accomplished by shifting R2 data left, leaving the highest order or most significant R2 digit (MSDR2) in D counter 38, and using this digit to control the number of ADD cycles. During each ADD cycle, the contents of register R0 (the multiplicand) are added to the contents of register R1 (initially zero). D counter 38 is sequenced after each ADD cycle is completed. When the digit in the D counter has been receded or counted down to zero, shift logic 29 causes the contents of register R1 to be shifted one column to the left during one pass of the field word through arithmetic unit 30, leaving the highest order or most significant R1 digit (MSDR1) in D counter 38 at the end of the pass. Shift logic 29 then causes the contents of register R2 to be shifted left during the next pass of the field word through arithmetic unit 30. At the beginning of this data pass, the digit in D counter 38 (MSDR1) is placed in the least significant digit (LSD) position of register R2 (the C2R2 position), while the most significant R2 digit (MSDR2) is left in the D counter at the end of this pass. This digit is then used to control the number of ADD cycles as described above.

Successive series of repetitive ADD cycles and SHIFT LEFT R1 and SHIFT LEFT R2 steps are performed until each digit of the original multiplier in register R2 has been used to control the repetitive ADD cycles. Since MSDR1 is relocated in LSDR2 once for each series of ADD cycles of the combined action of SHIFT LEFT R1 and SHIFT LEFT R2, after the original LSDR2 has been placed in D counter 38 and the D counter has been receded to zero, the product of the original multiplier and multiplicand will be located in register R2.

Entry phase counter 26 then causes shift logic 29 to shift down the contents of registers R2, R3, and R4 by one register. With the product now located in register R1, and the MULTIPLY operation completed, the calculator returns automatically to IDLE condition and DISPLAY mode. For a more detailed discussion of machine operation during MULTIPLY, see Sections 16.7.4 and 16.8.

To simplify illustration of the DIVIDE operation, assume that digit words representing a dividend and a divisor have already been entered in registers R2 and R1, respectively, and decimal aligned. The operator then actuates the DIVIDE function key, which action is translated by encoder circuit 14 into machine commands. One output signal from encoder circuit 14 triggers entry phase counter 26, which directs shift control logic 29 to shift the decimally aligned contents of register R1 down into the R0 register, and clear the R1 register. This is achieved in the same manner as discussed above in the description of the MULTIPLY operation.

Division is performed by repeated subtraction of the divisor in register R0 from the dividend which is progressively shifted from register R2 into register R1 and counting the number of successful subtractions. Subtraction is performed by complementary additon as described above in the discussion of the SUBTRACT operation. During the DIVIDE operation, the contents of register R0 are subtracted from the contents of register R1 and "1" is added to register R2 whenever the remainder in register R1 is positive. When the remainder is negative, entry phase counter 26 causes add logic circuit 28 to restore the former contents of register R1 by adding R0 to R1. Next, entry phase counter 26 causes shift logic 29 to shift the contents of register R2 one column to the left during one pass of the field word through arithmetic unit 30, leaving MSDR2 in D counter 38 at the end of the pass. Shift logic 29 then causes the contents of register R1 to be shifted left during the next pass of the field word through arithmetic unit 30. At the beginning of this data pass, the digit in D counter 38 (MSDR2) is placed in the least significant digit position of register R1 (C2R1 position). After this SHIFT LEFT R1 step, repetitive subtraction of R0 from R1 is again performed, "1" is added to register R2 for each successful subtraction until the remainder in register R1 again is negative, after which the contents of register R1 are restored and the above shifting operations are again performed.

Successive series of repetitive SUBTRACT cycles and SHIFT LEFT R2 and SHIFT LEFT R1 steps are performed until the least significant digit of register R2 has been shifted into the least significant digit position of register R1, successive subtract cycles have been performed, a negative remainder in register R1 has been obtained, and the contents of register R1 have been restored. Since "1" has been added to register R2 for each successful SUBTRACT cycle and since this sum has been shifted left once during each SHIFT LEFT R2 step, after the final restoration of the contents of register R1, the quotient of the original dividend and divisor will be located in register R2.

Entry phase counter 26 next causes shift logic 29 to SHIFT DOWN the contents of register R2, R3, and R4 by one register. With the quotient now located in register R1, and the DIVIDE operation completed, the calculator returns automatically to IDLE condition and DISPLAY mode. For a more detailed discussion of machine operation during DIVIDE, see Sections 16.7.4 and 16.9.

In addition to the above-described data handling operations and suboperations, which set forth calculator operation during the four basic arithmetic operations of ADD, SUBTRACT, MULTIPLY, and DIVIDE, the calculator is also capable of performing other operations and suboperations such as RECALL and STORE which are not vital to an understanding of the simplified FIG. 1 block diagram.

SELF-SYNCHRONIZATION

FIG. 5 illustrates those portions of timing unit 60 utilized to generate the timing signals of FIGS. 4A and 4B, as well as the circuit elements which provide a self-synchronous recirculating memory insensitive to oscillator drift or thermal variation of the pulse propagation time of delay line 54 of FIG. 1. In the ensuing description, the reference numerals used to identify the logic gates and inverters shown in FIG. 5 have been derived by adding 100 to the numerals used to identify the corresponding gates and inverters in the referenced Ragen patent. For example, gate 199 in FIG. 5 corresponds to gate 99 of the referenced patent; gate 222 corresponds to gate 122, etc. In addition, the figure wherein each described element is illustrated in the referenced application is given in parentheses after the first reference thereto.

Turning now to FIG. 5, enclosed within the broken lines signifying timing unit 60 is oscillator 62 (FIG. 284), the output of which is coupled to one input of inverting AND-gate 199 (FIG. 284). Oscillator 62 is a free running oscillator with a frequency of about 666 KHZ in the preferred embodiment. Because of the self-synchronous operation of the invention, the stability of oscillator 62 is not critical and may vary within reasonable limits. It has been found that frequency drift as much as 6 percent can be tolerated with no adverse effects on the operation of the system.

The output of AND-gate 199 is coupled to the toggle input of clock flip-flop 200 (FIG. 284), hereinafter designated CLKFF 200. The set output of CLKFF 200 is coupled to one input of inverting AND-gate 203 (FIG. 275); the reset output of CLKFF 200 is coupled to the toggle input of A flip-flop 210, the first of four serially connected flip-flops comprising bit counter 66 indicated by the broken lines. As will be evident to those skilled in the art, A flip-flop 210, B flip-flop 211, C flip-flop 212, and D flip-flop 213 (FIG. 286) comprise a scale of 16 counter, with special connections to the set inputs of AFF 210 and BFF 211, the purpose of which is described below. The various outputs of AFF 210, BFF 211, CFF 212, and DFF 213 are sampled via gating circuitry, which has been omitted for clarity, to provide the 16 bit time signals shown in FIG. 4B.

The output of bit counter 66, which comprises the reset output of DFF 213, is coupled to the toggle input of EFF 214, the first of three serially connected flip-flops comprising register counter 67 indicated by the broken lines. As will be evident to those skilled in the art, EFF 214, FFF 215, and GFF 216 (FIG. 288) comprise a scale of six counter, the permutation from the normal count of eight being provided by coupling the reset output of GFF 216 to the set input of FFF 215 via an inverter 139 (FIG. 288). The various outputs of EFF 214, FFF 215, and GFF 216 are sampled via gating circuitry, which has been omitted for clarity, to provide the six register signals 81–86 shown in FIG. 4A.

The output of register counter 67, which comprises the reset output of GFF 216, is coupled to the toggle input of HFF 217, the first of four serially connected flip-flops comprising column counter 68 indicated by the broken lines. As will be evident to those skilled in the art, HFF 217, JFF 218, KFF 219, and LFF 220 (FIG. 290) comprise a scale of 16 counter. The various outputs of HFF 217, JFF 218, KFF 219, and LFF 220 are sampled via gating circuitry, only one of which is shown, to provide the 16 column signals C0–C15. Each column signal is similar to the single column C signal 80 illustrated in FIG. 4A. The reset outputs of HFF 217, JFF 218, KFF 219, and LFF 220 comprise the inputs of inverting AND-gate 222 (FIG. 291). The output of this gate, labeled CO SG S for CO signal source, is utilized to stop the timing unit in the manner described below. The elements comprising display counter 69 of timing unit 60 of the calculator of FIG. 1 are not necessary for an understanding of the present invention and for clarity have been omitted.

C0 signal is coupled to the set input of OCFF 224 (FIG. 284), the set output of which is coupled to the second input of AND-gate 199 and to the set inputs of AFF 210 and BFF 211. The set output of OCFF 224, labeled HOME SG S for HOME signal source, is also coupled to portions of control unit 20 and is used to enable certain portions of the circuitry contained therein. For example, HOME signal is used to toggle entry phase counter 26 to the next step in a given sequence.

The output of read amp 56 of memory unit 50 of FIG. 1 is coupled via two inverting OR-gates 123, 190 (FIG. 259) and an inverter 266 (FIG. 261) to one of two reset inputs of OCFF 224 labeled ADV A. The second reset input of OCFF 224 is obtained from the set output of CLEAR ALL flip-flop 228 (FIG. 228), hereinafter designed CLR ALL FF 228, which is also coupled to one input of AND-gate **199*a* (FIG. 308). The set input to CLR ALL FF 228 is derived from known circuitry omitted for clarity which provides a signal whenever the CLEAR ALL key of the calculator keyboard is actuated. The first of two reset inputs to CLR ALL FF 228 labeled DPKD for decimal point key depressed is derived from similar known circuitry which provides a signal whenever the calculator decimal point key has been actuated. The second reset input to CLR ALL FF 228 is obtained from the set output of common digit flip-flop 230 (FIG. 230), hereinafter designated CDFF 230**.

The set input to CDFF 230 is derived from known circuitry which provides an appropriate signal whenever any of the calculator digit keys are actuated. The reset input to CDFF 230 is derived from the same source as the set input to CLR ALL FF 228.

As noted above, the set output of CLKFF 200 is coupled to one input of inverting AND-gate 203. A second input, which is derived from bit counter 66 by appropriate gating circuitry not shown, is $\overline{B0 + B1 + B14 + B15}$ which is true during B2–B13 times. The third input to AND-gate 203 is C CTR Z which is true whenever C counter 36 of arithmetic unit 30 in FIG. 1 holds a count of zero. The output of AND-gate 203 is coupled to AND-gate 199*a*, along with the set output of CLR ALL FF 228. The output of AND-gate 199*a* is coupled to write amp 52 of memory unit 50.

The operation of the circuitry of FIG. 5 is as follows. When power is first applied to the calculator, oscillator 62 begins to function after a very brief warm up period. At this time, no data is contained in the recirculating memory system. Subsequent actuation of the CLR ALL key sets CLR ALL FF 228, which resets OCFF 224 via lead 229. OCFF 224 reset unblocks inverting AND-gate 199 and allows the alternating output of oscillator 62 to repeatedly toggle CLKFF 200. Although the alternating set output of CLKFF 200 is applied to inverting AND-gate 203, the output of this gate remains false since C CTR Z remains true (no data in the recirculating memory). However, the alternating reset output of CLKFF 200 applied to bit counter 66 repeatedly toggles AFF 210 and causes bit counter 66, as well as register counter 67 and column counter 68, to cycle. At the end of the first complete cycle of the counter chain, CO signal appears at the output of inverting AND-gate 222 and is applied to the set input of OCFF 224. OCFF 224 does not set at this time, however, due to the overriding presence at the right reset input thereof of the true signal from the set output of CLR ALL FF 228. Thus, occurrence of CO signal does not alter the state of AND-gate 199 which continues to allow oscillator 62 to repeatedly toggle CLK 200. CLK FF 200, in turn, continues to count up the counter chain. Thus, during the state—termed the CLEARED state—the counter chain comprised of bit counter 66 register counter 67, and column counter 68 runs free. In addition, gate 199*a*, which drives write amp 52, is blocked by the set output of CLR ALL FF 228, thereby preventing any pulses from being written onto delay line 54.

With the calculator in the CLEARED state and the counter chain running free, actuation of any digit key or the decimal point key places the system in the IDLE state as follows. If a digit key is actuated, CDFF 230 is set, and the set output of CDFF 230 resets CLR ALL FF 228. Alternatively, actuation of the decimal point key directly resets CLR ALL FF 228. The false transition of the set output of CLR ALL FF 228 applied to the input of AND-gate 199*a* causes the production of a single pulse at the output thereof (gate 203 output is simultaneously false) which is applied to write amp 52, resulting in a single pulse on delay line 54. Thereafter, when CO signal appears at the output of AND-gate 222 and is applied to the set input of OCFF 224, this flip-flop will set since the right reset input thereto is false (CLR ALL FF 228 reset). OCFF 224 set blocks AND-gate 199, thereby preventing oscillator 62 from further toggling CLKFF 200. OCFF 224 set also resets bit counter 66 to the predetermined count configuration of 1100 via lead 225. Although not absolutely necessary, it has been found economical and desirable to start bit counter 66 from this advanced predetermined count.

After the single pulse formerly written onto delay line 54 has traveled the length thereof and been received by read amp 56, the corresponding pulse output of read amp 56 is applied via gates 123, 190 and inverter 226 to the reset input of OCFF 224, causing this flip-flop to reset. OCFF 224 reset opens AND-gate 199, oscillator 62 again begins to toggle CLKFF 200 and the counter chain begins to cycle from the above-noted advanced predetermined count. After one complete cycle, CO signal at the set input of OCFF 224 again blocks gate 199, thereby stopping the counter chain. Further action proceeds as described above.

From the above description, it is now apparent that during the IDLE state, the counter chain is started by the first pulse received by read amp 56 from delay line 54 and stopped by CO signal, which appears once at the end of each cycle of the counter chain. The propagation time of a pulse along a delay line, as well as the propagation time of a pulse through any dynamic storage device, will vary with the temperature of the storage elements. In a simialr manner, the frequency of an oscillator, which determines the period of the counter chain, is subject to variation due to temperature and voltage fluctuations. However, so long as the travel time of a single pulse along delay line 54 is greater than a single period of the counter chain, the CO or stop signal will always appear thereafter to start the counter chain from the correct initial count. Thus, in selecting circuit parameters to implement the invention, a dynamic storage device should be chosen which has a minimum travel time greater than the maximum period of the counter chain. In the preferred embodiment of the invention, an acoustic delay line having a five millisecond delay time was found to provide excellent results with the timing unit components described above.

If the CLEAR ALL key is actuated with the calculator in the IDLE state, the FIG. 5 system reverts the CLEARED state with action of the individual components proceeding as already described above.

As will now be apparent to those skilled in the art, the invention described above provides a self-synchronous recirculating memory which is not affected either by variation in the pulse propagation time of the dynamic storage means or by frequency drift of the timing unit oscillator. Thus, expensive and elaborate compensation networks formerly required in electronic desk top calculators to correct for such variations are completely eliminated by the present invention. Moreover, other uses for self-synchronous recirculating memories constructed according to the invention will occur to those skilled in the art.

While the foregoing provides a full disclosure of the preferred embodiment of the invention, it is understood that various modifications, alternate constructions, and equivalents may be employed without departing from the true spirit and scope of the invention. Therefore, the above description and illustrations should not be construed as limiting the scope of the invention, which is solely defined by the appended claims.

What is claimed is:

1. An electronic device comprising:

a memory loop for serially recirculating data including a synchronizing signal stored therein;

a timing unit coupled to said memory loop for providing data entry and recirculation timing signals;

said timing unit including a free-running oscillator for providing timing reference pulses;

control means coupled to said timing unit for controlling the generation of said timing signals;

means for coupling said synchronizing signal to said control means to initiate the generation of said timing signals; and means for coupling at least a preselected one of said timing signals to said control means to stop the generation of said timing signals.

2. The device of claim 1 further including means coupled to said memory loop for initially inserting said synchronizing signal into said memory loop.

3. The device of claim 1 wherein said memory loop includes an acoustic delay line.

4. The device of claim 1 wherein said timing unit includes a plurality of serially connected counters, and said control means includes means for resetting said counters to a predetermined initial state in response to the generation of said preselected one of said timing signals.

5. The device of claim 1 wherein said memory loop includes a storage device having an access portion and further including an arithmetic unit coupled to said access portion of said storage device for performing operations on said data, said arithmetic unit having a first portion for providing a normal recirculation path for said data in said memory loop.

6. The device of claim 1 wherein said timing unit includes a gate coupled to said oscillator and said control means includes a bistable device coupled to an enabling input of said gate.

7. The device of claim 6 wherein said preselected one of said timing signals is coupled to an input of said bistable device.

* * * * *